United States Patent
Mita

(10) Patent No.: US 9,973,651 B2
(45) Date of Patent: May 15, 2018

(54) IMAGE PROCESSING APPARATUS AND COMPUTER-READABLE RECORDING MEDIUM STORING PROGRAM

(71) Applicant: Konica Minolta, Inc., Tokyo (JP)

(72) Inventor: Mieko Mita, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 15/296,413

(22) Filed: Oct. 18, 2016

(65) Prior Publication Data

US 2017/0134612 A1    May 11, 2017

(30) Foreign Application Priority Data

Nov. 9, 2015 (JP) .................................. 2015-219739

(51) Int. Cl.
*H04N 1/393* (2006.01)
*G06K 15/02* (2006.01)
*H04N 1/60* (2006.01)

(52) U.S. Cl.
CPC ....... *H04N 1/3935* (2013.01); *G06K 15/1822* (2013.01); *G06K 15/1874* (2013.01); *G06K 15/1877* (2013.01); *H04N 1/6008* (2013.01); *H04N 2201/0094* (2013.01)

(58) Field of Classification Search
USPC ....................................................... 358/1.12
See application file for complete search history.

(56) References Cited

U.S. PATENT DOCUMENTS

| 2014/0376013 A1* | 12/2014 | Kawabe | G06K 15/027 |
| | | | 358/1.12 |
| 2015/0181076 A1* | 6/2015 | Mita | H04N 1/401 |
| | | | 358/1.2 |
| 2017/0109617 A1* | 4/2017 | Narimatu | G03G 15/16 |

FOREIGN PATENT DOCUMENTS

| JP | 2015-004702 A | 1/2015 |
| JP | 2015-035643 A | 2/2015 |

OTHER PUBLICATIONS

Toru, Image Processing Device Image Forming Device and Image Processing Program, Feb. 19, 2015, Machine Translated Japanese Patent Application Publication, JP 2015-035643, All Pages.*
Office Action in corresponding Japenese Patent Application No. 2015-219739 dated Sep. 26, 2017 (8 pages).

* cited by examiner

*Primary Examiner* — Ngon Nguyen
(74) *Attorney, Agent, or Firm* — Osha Liang LLP

(57) ABSTRACT

An image processing apparatus includes an output image reading portion that reads an image of a physical document. The physical document includes a desired print image and a line image. The apparatus further includes a line image detecting portion that detects the line image at a predetermined position of the physical document using the image, a line image analyzing portion that determines a line width of the line image, a line-width correction value determining portion that compares the determined line width to a preliminarily set line-width threshold value and determines a line-width correction value based on the comparison, and a line-width correcting portion that performs line width correction on a to be formed line image based on the line-width correction value.

9 Claims, 8 Drawing Sheets

IMAGE PROCESSING APPARATUS AND COMPUTER-READABLE RECORDING MEDIUM STORING PROGRAM

BACKGROUND OF THE INVENTION

Field of the Invention

The present invention relates to an image processing apparatus and a computer-readable recording medium storing a program.

Background

In an image processing apparatus, it is known that line width change is caused in a line image such as a printed character when output print processing is carried out repeatedly. A printed matter having a collapsed character due to the line width change becomes an error output and normally becomes a waste sheet to be disposed. For such line width change of a line image such as a character, the image processing apparatus is provided with a line width correction function of performing line width correction to suppress the deterioration of a character or the like (refer to Patent Literatures 1 and 2, for example).

Patent Literature 1 discloses a technique which collects action information indicating the action state of each part when a test action of printing a test pattern of a line image on a recording sheet and reading the test pattern as image data in an image reading portion is carried out, performs evaluation of a fine line in the image data obtained in the test action by taking the collected action information into account, and performs correction related to fine line printing based on the evaluation result. Further, Patent Literature 2 discloses a technique which provides a line width correction function of correcting the line width of a line or a character in image data, reads an output document with a reading device, and determines a line width adjustment amount from image data obtained by the reading.

RELATED ART DOCUMENT

Patent Document

Patent Literature 1: Japanese Patent Laid-Open Publication No. 2015-4702

Patent Literature 2: Japanese Patent Laid-Open Publication No. 2015-35643

SUMMARY OF THE INVENTION

However, in both prior arts disclosed in Patent Literatures 1 and 2, it is necessary to use a dedicated chart when executing the line width correction function, and therefore a waste sheet is generated. In particular, in high volume printing, when the dedicated chart is output frequently for maintaining line width accuracy, a large volume of waste sheet is generated and furthermore printing productivity is deteriorated. Further, when the output frequency of the dedicated chart is reduced for suppressing the generation of the waste sheet so as not to deteriorate the printing productivity, the line width accuracy is not always maintained and furthermore the output print has a line width different between before and after the line width correction.

One or more embodiments of the invention provide an image processing apparatus and an image processing method capable of performing line width correction without using a dedicated chart.

An image processing apparatus in accordance with embodiments of the invention includes:

an output image reading portion that reads an image of an output document which has been image-formed and output in an image forming portion and is available as a printed matter;

a line image detecting portion that detects a line image formed at a predetermined position of the output document from image data read by the output image reading portion;

a line image analyzing portion that analyzes a line width of the line image detected by the line image detecting portion;

a line-width correction value determining portion that compares the line width analyzed by the line image analyzing portion with a preliminarily set line-width threshold value and to determine a line-width correction value based on a comparison result thereof; and a line-width correcting portion that performs line width correction on a line image to be formed in the image forming portion according to the line-width correction value determined by the line-width correction value determining portion.

Further, a non-transitory computer-readable recording medium in accordance with embodiments of the invention stores a program, which when executed by a computer of an image forming apparatus including:

an output image reading portion reads an image of an output document which has been image-formed and output in an image forming portion and is available as a printed matter;

a line image detecting portion that detects a line image formed at a predetermined position of the output document from image data read by the output image reading portion;

a line image analyzing portion that analyzes a line width of the line image detected by the line image detecting portion;

a line-width correction value determining portion that compares the line width analyzed by the line image analyzing portion with a preliminarily set line-width threshold value and to determine a line-width correction value based on a comparison result thereof; and a line-width correcting portion that performs line width correction on a line image to be formed in the image forming portion according to the line-width correction value determined by the line-width correction value determining portion, causes processing including:

reading the image of the output document which has been image-formed and output in the image forming portion and is available as a printed matter;

detecting the line image formed at a predetermined position of the output document from the image data obtained by reading in the output document reading step; and analyzing a line width of the line image detected in the line image detecting step.

In the image processing apparatus or non-transitory computer-readable recording medium storing a program described above, the "output document which is available as a printed matter" means a normal output document which has a desirable print image formed based on the image data and does not become a waste sheet. In contrast, an "output document which is not available as a printed matter" becomes a disposal target as a waste sheet. Then, by detecting a line image formed at a predetermined position of an output document which is available as a printed matter and performing the line width correction based on the line image, it is possible to perform the line width correction without using the dedicated chart.

DETAILED DESCRIPTION

Hereinafter, embodiments of the invention (in the following, called "embodiments") will be explained in detail by the use of drawings. The present invention is not limited to the disclosed embodiments, and various kinds of numerical value or the like in the embodiments are exemplifications. Here, in the following explanation or in each of the drawings, the same sign is used for the same element or an element having the same function, and duplicated explanation will be omitted.

[Configuration Example of an Image Forming Apparatus to which an Image Processing Apparatus in Accordance with Embodiments of the Invention is Applied]

Figure 1:
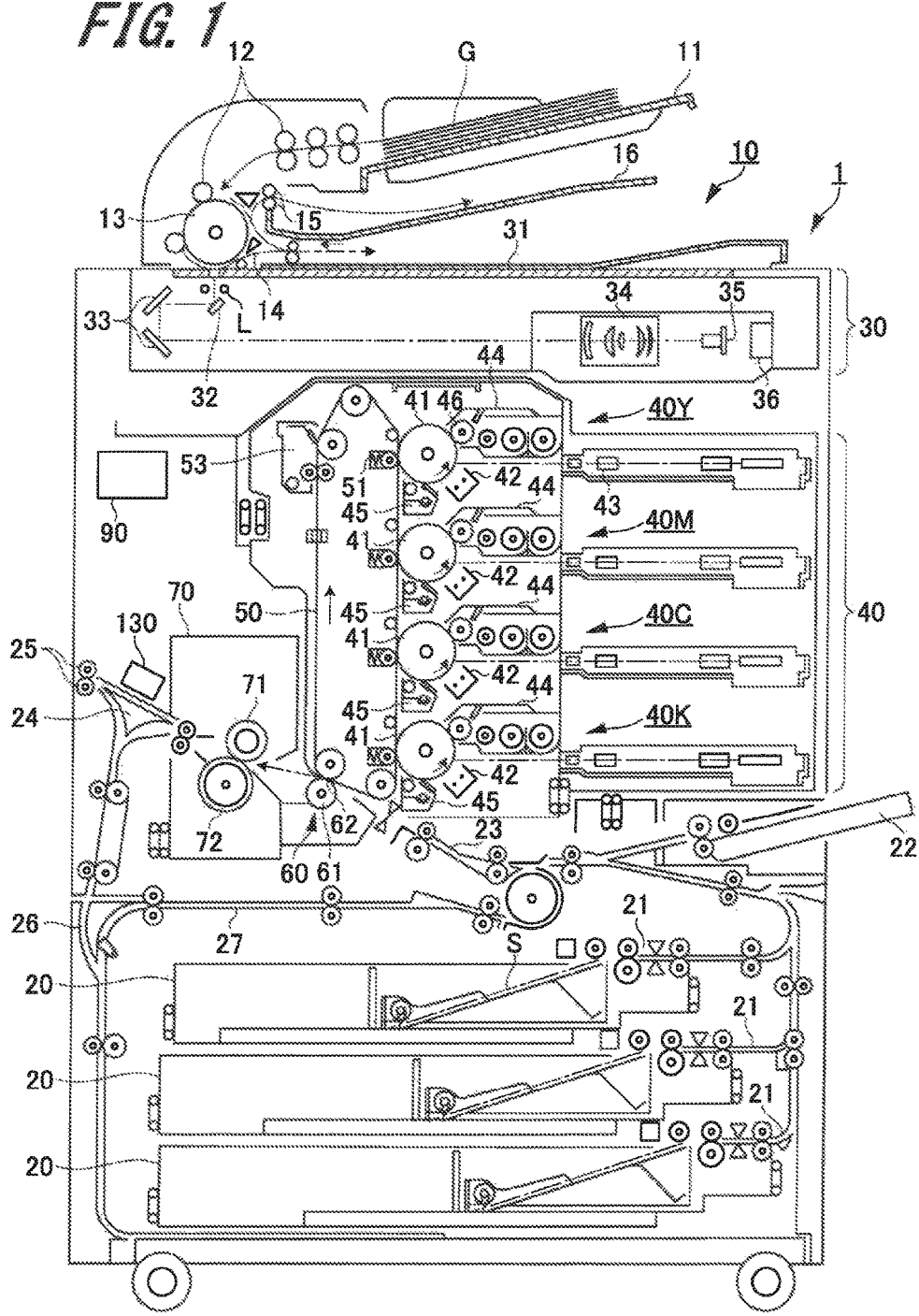
FIG. 1 is an entire configuration diagram showing an outline of a system configuration of one example of an image forming apparatus to which an image processing apparatus in accordance with embodiments of the invention is applied.

FIG. 1 is an entire configuration diagram showing an outline of a system configuration of one example of an image forming apparatus to which an image processing apparatus in accordance with embodiments of the invention is applied. Here, an image forming apparatus is exemplified for the application to a copy machine.

As shown in FIG. 1, an image forming apparatus 1 according to the present application example employs an electro-photographic method which forms an image on a sheet S using static electricity, and is a tandem type color image forming apparatus which overlaps four color toners of yellow (Y), magenta (M), cyan (C) and black (K). The image forming apparatus 1 is configured with a document conveying portion 10, a sheet accommodating portion 20, a document image reading portion 30, an image forming portion 40, an intermediate transfer belt 50, a secondary transfer portion 60, a fixing portion 70, and a control substrate 90.

The document conveying portion 10 includes a document feeding stage 11 on which a document G is set, a plurality of rollers 12, a conveyance drum 13, a conveyance guide 14, a document ejecting roller 15, and a document receiving tray 16. The document G set on the document feeding stage 11 is conveyed sheet by sheet by the plurality of rollers 12 and the conveyance drum 13 to a reading position of the document image reading portion 30. The conveyance guide 14 and the document ejecting roller 15 eject the document G conveyed by the plurality of rollers 12 and the conveyance drum 13 to the document receiving tray 16.

The sheet accommodating portion 20 is disposed in the lower part of an apparatus main body, and is provided in plurality depending on the size and the kind of the sheet S. The sheet S is fed by a sheet feeding portion 21 to be sent to a conveyance portion 23, and conveyed by the conveyance portion 23 to the secondary transfer portion 60 of a transfer position. Further, a manual insertion portion 22 is provided near the sheet accommodating portion 20. From the manual insertion portion 22, a special sheet set by a user such as a sheet having a size not accommodated in the sheet accommodating portion 20, a tag sheet having a tag, and an OHP sheet is sent to the transfer position.

The document image reading portion 30 reads an image of a document G conveyed by the document conveying portion 10 or an image of a document placed on a document stage 31 to generate image data. Specifically, the image of the document G is illuminated by a lamp L. Reflected light from the document G based on the illumination light from the lamp L is guided by a first mirror unit 32, a second mirror unit 33, and a lens unit 34 in this order, and forms an image on a light receiving face of an imaging element 35. The imaging element 35 performs photo-electric conversion on the incident light and outputs a predetermined image signal. The image signal output from the imaging element 35 is A/D converted to generate image data.

Further, the document image reading portion 30 includes an image read control portion 36. The image read control portion 36 performs known image processing such as shading correction, dither processing, and compression on the image data generated by the A/D conversion, and stores the image data in a RAM 103 (refer to FIG. 2) mounted on the control substrate 90. Note that the image data is not limited to the data obtained by the reading from the document G by the document image reading portion 30 and may be data received from a PC (Personal Computer) 120 (refer to FIG. 2) connected to the image forming apparatus 1 or an external apparatus such as a another image forming apparatus.

The image forming portion 40 and the intermediate transfer belt 50 of an image carrier are disposed between the sheet accommodating portion 20 and the document image reading portion 30. The image forming portion 40 has four image forming units of a first to fourth image forming units 40Y, 40M, 40C, and 40K for forming a toner image of each color of yellow (Y), a toner image of magenta (M), a toner image of cyan (C), and a toner image of black (K), respectively.

The first image forming unit 40Y forms the yellow toner image, and the second image forming unit 40M forms the magenta toner image. Further, the third image forming unit 40C forms the cyan toner image, and the fourth image forming unit 40K forms the black toner image. These four image forming units 40Y, 40M, 40C, and 40K have the same configuration, respectively. Accordingly, the first image forming unit 40Y will be explained here.

The first image forming unit 40Y includes a drum-shaped photoreceptor (photoreceptor drum) 41 of the image carrier, and a charging portion 42, an exposure portion 43, a development portion 44, and a cleaning portion 45 which are disposed around the photoreceptor 41. The photoreceptor 41 rotates under the drive of an unillustrated drive motor. The charging portion 42 charges the surface of the photoreceptor 41 uniformly by providing charge to the photoreceptor 41. The exposure portion 43 forms an electrostatic latent image on the photoreceptor 41 by performing exposure onto the surface of the photoreceptor 41 using a laser beam, for example, based on the image data read from the document G or transmitted from the external apparatus.

The development portion 44 develops the electrostatic latent image formed on the photoreceptor 41 using two-component developer made of a toner and a carrier. The toner is a particle to form an image. The carrier has the function of providing appropriate charge for the toners by frictional charging in the mixing with the toners in the development portion 44, the function of feeding the toners to a development region facing the photoreceptor 41, and the function of forming a development electric field so as to cause the toners to develop the electrostatic latent image in high fidelity on the photoreceptor 41. The development portion 44 includes a development sleeve 46 to supply the developer to the photoreceptor 41. The development portion 44 causes the yellow toners to adhere to the electrostatic latent image formed on the photoreceptor 41. Thereby, the yellow toner image is formed on the surface of the photoreceptor 41.

Here, a development portion 44 of the second image forming unit 40M causes the magenta toners to adhere to the photoreceptor 41, and a development portion 44 of the third image forming unit 40C causes the cyan toners to adhere to the photoreceptor 41. Then, a development portion 44 of the fourth image forming unit 40K causes the black toners to adhere to the photoreceptor 41.

The cleaning portion 45 removes the toners remaining on the surface of the photoreceptor 41.

The toners adhering onto the photoreceptor 41 are transferred to the intermediate transfer belt 50 of an intermediate transfer body. The intermediate transfer belt 50 is formed endlessly, and wound across a plurality of rollers. The intermediate transfer belt 50 rotates in the direction opposite to the rotation (movement) direction of the photoreceptor 41 under the drive by an unillustrated drive motor.

In the intermediate transfer belt 50, four primary transfer portions 51 are arranged in positions facing the respective photoreceptors 41 of the four image forming units 40Y, 40M, 40C and 40K. The primary transfer portion 51 applies a voltage having the polarity opposite to that of the toner to the intermediate transfer belt 50, and thereby transfers the toners adhering onto the photoreceptor 41 to the intermediate transfer belt 50.

Then, by the rotation of the intermediate transfer belt 50, the toner images formed by the four image forming units 40Y, 40M, 40C, and 40K are transferred sequentially onto the surface of the intermediate transfer belt 50. Thereby, the toner images of yellow, magenta, cyan, and black are overlapped and thus a color image is formed on the intermediate transfer belt 50.

Further, a belt cleaning device 53 is provided in a state of facing the intermediate transfer belt 50. The belt cleaning device 53 cleans the surface of the intermediate transfer belt 50 after the transfer of the toner images to the sheet S is finished.

The secondary transfer portion 60 is disposed near the intermediate transfer belt 50 on the downstream side of the conveyance portion 23 in the sheet conveyance direction. The secondary transfer portion 60 causes the sheet S conveyed by the conveyance portion 23 to contact the intermediate transfer belt 50 and thereby transfers the toner images formed on the outer circumference surface of the intermediate transfer belt 50 to the sheet S.

The secondary transfer portion 60 includes a secondary transfer roller 61. The secondary transfer roller 61 is pressure-contacted with a facing roller 52. Then, the part where the secondary transfer roller 61 and the intermediate transfer belt 50 contact each other forms a secondary transfer nip portion 62. The position of the secondary transfer nip portion 62 is a transfer position where the toner images formed on the outer circumference surface of the intermediate transfer belt 50 are transferred to the sheet S.

The fixing potion 70 is provided on the ejection side of the sheet S in the secondary transfer portion 60. The fixing portion 70 pressurizes and heats the sheet S to fix the transferred toner images onto the sheet S. The fixing portion 70 is configured with a pair of fixing members; a fixing upper roller 71 and a fixing lower roller 72, for example. The fixing upper roller 71 and the fixing lower roller 72 are disposed in a state pressure-welded to each other, and a fixing nip portion is formed as a pressure welding portion between the fixing upper roller 71 and the fixing lower roller 72.

A heating portion is provided inside the fixing upper roller 71. The roller portion of the fixing upper roller 71 is heated by radiation heat from the heating portion. Then, the heat of the roller portion in the fixing upper roller 71 is transferred to the sheet S and thereby the toner image is fixed onto the sheet S.

The sheet S is conveyed so that the face onto which the toner image is transferred by the secondary transfer portion 60 (fixing target face) and the fixing upper roller 71 face each other, and passes through the fixing nip portion. Accordingly, the pressurizing by the fixing upper roller 71 and the fixing lower roller 72 and the heating by the heat from the roller portion of the fixing upper roller 71 are performed on the sheet S passing through the fixing nip portion.

A switching gate 24 is disposed on the downstream side of the fixing portion 70 in the conveyance direction of the sheet S. The switching gate 24 switches the conveyance path of the sheet S which has passed through the fixing portion 70. That is, the switching gate 24 causes the sheet S to travel straight in the case of face-up sheet ejection in the image formation on one side of the sheet S. Thereby, the sheet S is ejected by a pair of sheet ejection rollers 25. Further, the switching gate 24 guides the sheet S downward in the case of face-up sheet ejection in the image formation on one side of the sheet S or in the case of the image formation on both sides of the sheet S.

In the case of face-down sheet ejection, after the sheet S is guided downward by the switching gate 24, the sheet S is turned over by a sheet reverse conveyance portion 26 and conveyed upward. Thereby, the turned-over sheet S is ejected by the pair of sheet ejection rollers 25. In the case of the image formation on both sides of the sheet S, after the sheet S is guided downward by the switching gate 24, the sheet S is turned over by the sheet reverse conveyance portion 26. Then, the turned-over sheet S is sent to the transfer position again by a sheet re-feeding path 27.

A post processing apparatus may be disposed on the downstream side of the pair of sheet ejection rollers 25 to perform the folding of the sheet S, staple processing on the sheet S, or the like.

In addition to the above configuration, the image forming apparatus 1 according to the present application example is configured with an output image reading portion 130 to read an image of an output document which has been image-formed and output in the image forming portion 40. The output image reading portion 130 is disposed on the conveyance path on the downstream side of the fixing portion 70 in the conveyance direction of the sheet S, for example, and optically reads the sheet S passing through on the conveyance path, that is, the image of the output document across the whole face of the document.

For example, a known read sensor configured with a combination of a light source emitting light to the sheet S passing through on the conveyance path and a line image sensor to read an image of one line in the width direction of the sheet S by receiving reflection light from the sheet S based on the emitted light can be used as the output image reading portion 130. Note that, while it is assumed here that the output image reading portion 130 is disposed on the conveyance path on the downstream side of the fixing portion 70 in the conveyance direction of the sheet S, the output image reading portion 130 may be disposed on the conveyance path of the sheet S in the post processing apparatus in a system having a configuration of disposing the above post processing apparatus on the downstream side of the pair of sheet ejection rollers 25.

The above explained image forming apparatus 1 according to the present application example is configured to perform the image formation based on the image data obtained by the reading from the document G by the document image reading portion 30, or the image data received from the external apparatus such as the PC 120 (refer to FIG. 2), but the image forming apparatus 1 is not limited to this example. The image forming apparatus 1 according to the present application example may be configured not to include the document conveying portion 10, the document image reading portion 30, and the like, for example, and to perform the image formation based on the image data supplied from the PC 120, for example.

[Hardware Configuration of Each Portion in the Image Forming Apparatus According to the Present Application Example]

Figure 2:
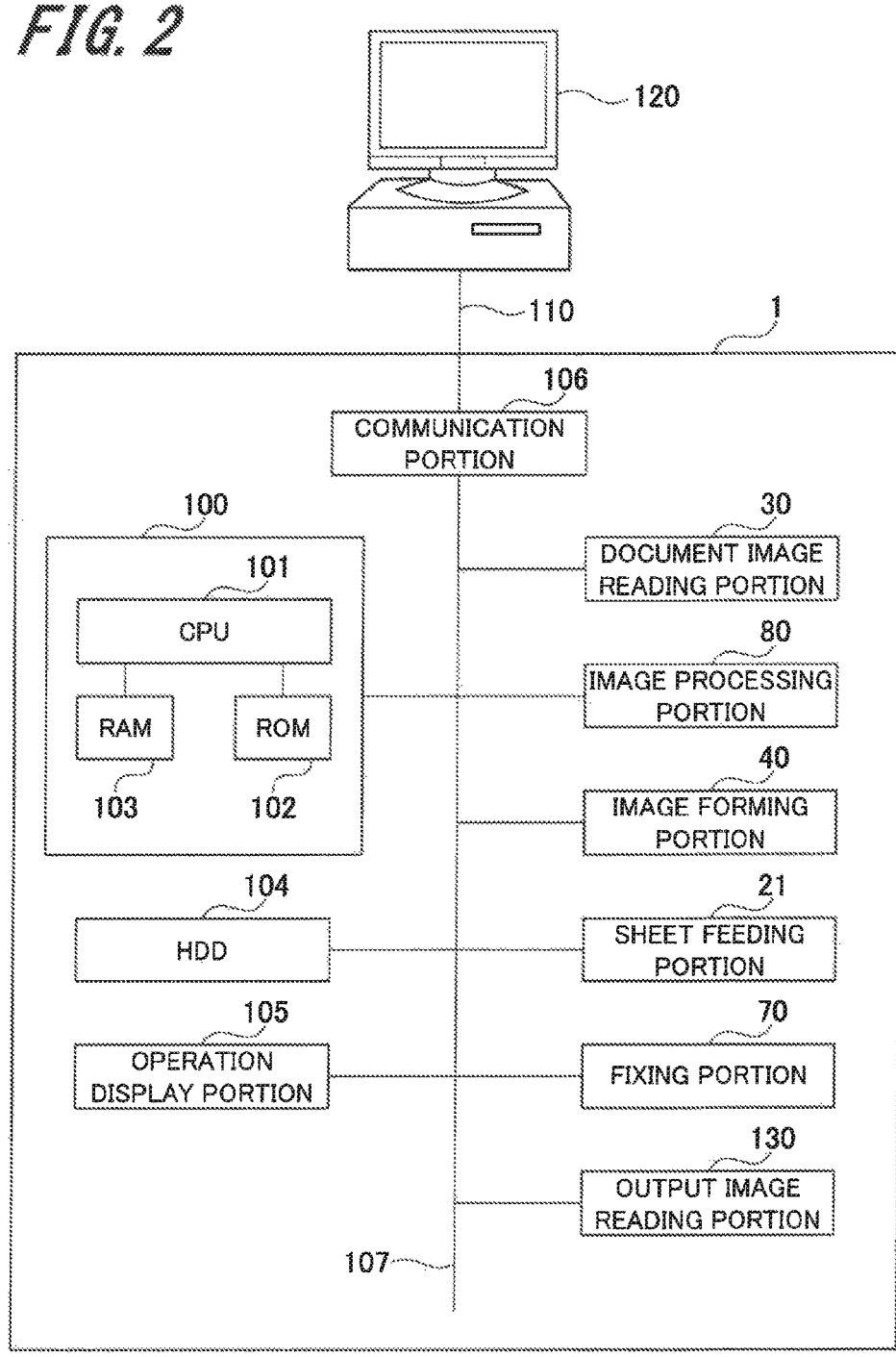
FIG. 2 is a block diagram showing one example of a hardware configuration of each portion in an image forming apparatus according to the present application example.

Next, a hardware configuration of each portion in the image forming apparatus 1 according to the present application example will be explained with reference to FIG. 2. FIG. 2 is a block diagram showing one example of a hardware configuration of each portion in the image forming apparatus 1.

As shown in FIG. 2, the image forming apparatus 1 includes a control portion 100. The control portion 100 is configured on the above described control substrate 90 (refer to FIG. 1).

The control portion 100 includes a CPU (Central Processing Unit) 101, a ROM (Read Only Memory) 102 for storing a program or the like to be executed by the CPU 101, and a RAM (Random Access Memory) 103 to be used as a work area of the CPU 101, for example. Here, an electrically-erasable programmable ROM can be used normally as the ROM 102, for example.

The CPU 101 is used as an example of a computer to control the entire image forming apparatus 1. The CPU 101 is connected with each of an HDD (Hard Disk Drive) 104, an operation display portion 105, and a communication portion 106 via a system bus 107. Further, the CPU 101 is further connected with each of the document image reading portion 30, an image processing portion 80, the image forming portion 40, the sheet feeding portion 21, the fixing portion 70, and the output image reading portion 130 via the system bus 107.

The HDD 104 stores the image data of a document image obtained by the read of the document image reading portion 30 and stores output image data or the like, and is used as an example of the computer-readable recording medium storing a program executed by the image forming apparatus 1. Here, the computer-readable recording medium storing the program executed by the image forming apparatus 1 is not limited to the HDD 104, and may be a recording medium such as a CD-ROM and a DVD-ROM, for example. The operation display portion 105 is a touch panel configured with a display such as a liquid crystal display device (LCD) and an organic ELD (Electro Luminescence Display). The operation display portion 105 displays an instruction menu for a user and information about the obtained image data, or the like. Further, the operation display portion 105 is provided with a plurality of keys, and receives data input by user's key operation for various kinds of instruction, characters, numerals, or the like, and outputs the input signal to the control portion 100.

The communication portion 106 receives job information transmitted from a PC (Personal Computer) 120 which is an external information processing apparatus via a communication line 110. Then, the communication portion 106 sends the received job information to the control portion 100 via the system bus 107. The job information includes image data of an image to be formed, and information associated with the image data such as the kind and the number of sheets to be used.

Note that, while the example of applying the PC 120 as an external apparatus is explained in one or more embodiments of the invention, the invention is not limited to this example. Another kind of apparatus such as a facsimile apparatus, for example, can be applied as the external apparatus other than the PC 120.

The document image reading portion 30 optically reads the document image and converts it into an electrical signal. For example, in the case of reading a color document, the document image reading portion 30 generates image data having luminance information of 10 bit gradations for each of RGB per pixel. The image data generated by the document image reading portion 30 or the image data transmitted from the PC 120 which is an example of an external apparatus connected to the image forming apparatus 1 is sent to the image processing portion 80 to be image-processed. The image processing portion 80 performs processing such as analog processing, A/D conversion, shading correction, image compression, and periodic non-uniformity (density periodic non-uniformity of an image) correction on the received image data.

For example, in the case of forming a color image with the image forming apparatus 1, the RGB image data generated by the document image reading portion 30 or the like is input into a color conversion LUT (Look Up Table) in the image processing portion 80. Then, the image processing portion 80 color-converts the RGB data into YMCK image data. Then, the image processing portion performs gradation reproduction characteristic correction, screen processing of dots or the like with reference to a density correction LUT, edge processing for emphasizing a fine line, or the like, on the color-converted image data.

The control portion 100 controls the entire image forming apparatus 1 under the control of the CPU 101. Specifically, the control portion 100 drives and controls the image forming portion 40 to forma toner image for image density control or a toner image for image formation and primarily transfer it to the intermediate transfer belt 50. Further, the control portion 100 drives and controls the secondary transfer portion 60 to secondarily transfer the toner image carried by the intermediate transfer belt 50 to the sheet S. Further, the control portion 100 drives and controls the fixing portion 70 to pressurize and heat the sheet S and fix the toner image onto the sheet S.

The output image reading portion 130 reads the sheet S passing through on the conveyance path on the downstream side of the fixing portion 70 in the conveyance direction of the sheet S, for example, that is, reads the image of the output document. Then, the output image reading portion 130 supplies the image data obtained by the reading from the output document to the control portion 100 via the system bus 107 or to the PC 120 of the external apparatus via the system bus 107, the communication portion 106, and the communication line 110, as information to be used in the line width correction for suppressing the deterioration of a character or the like against the change of the line width of a line image such as a character.

[Image Processing Apparatus in Accordance with Embodiments of the Present Invention]

The image data output from the output image reading portion 130 is supplied to the PC 120 as the information to be used for the line width correction, and thereby the processing of the line width correction is performed in the PC 120. The PC 120 performs the line width correction processing. The image processing apparatus in accordance with embodiments of the invention is also understood to be the image forming apparatus 1 (refer to FIG. 1) including the PC 120.

Figure 3:
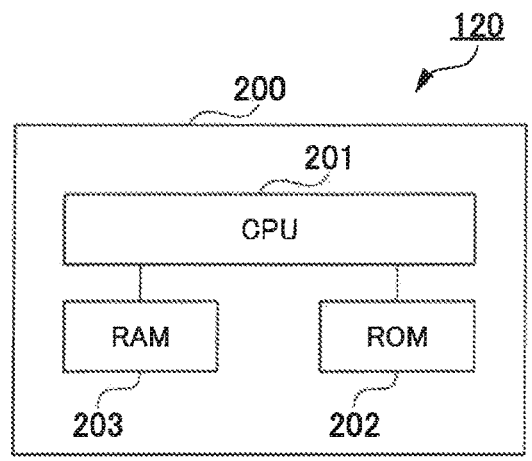
FIG. 3 is a block diagram showing one example of a configuration of a control portion in a personal computer (PC).

FIG. 3 shows one example of a configuration of a control portion in the PC 120. The control portion 200 of the PC 120 includes a CPU 201, a ROM 202 for storing a program or the like to be executed by the CPU 201, and a RAM 203 to be used as a work area of the CPU 201, for example. In one or more embodiments, the control portion 200 supplies desirable image data to be printed on the output document to the image forming apparatus 1. Further, in the image forming apparatus 1, the control portion 200 performs output print processing repeatedly and thereby executes the line width correction processing against the change of the line width when the change of the line width is caused in the line image such as a character or the like to be printed.

Figure 4:
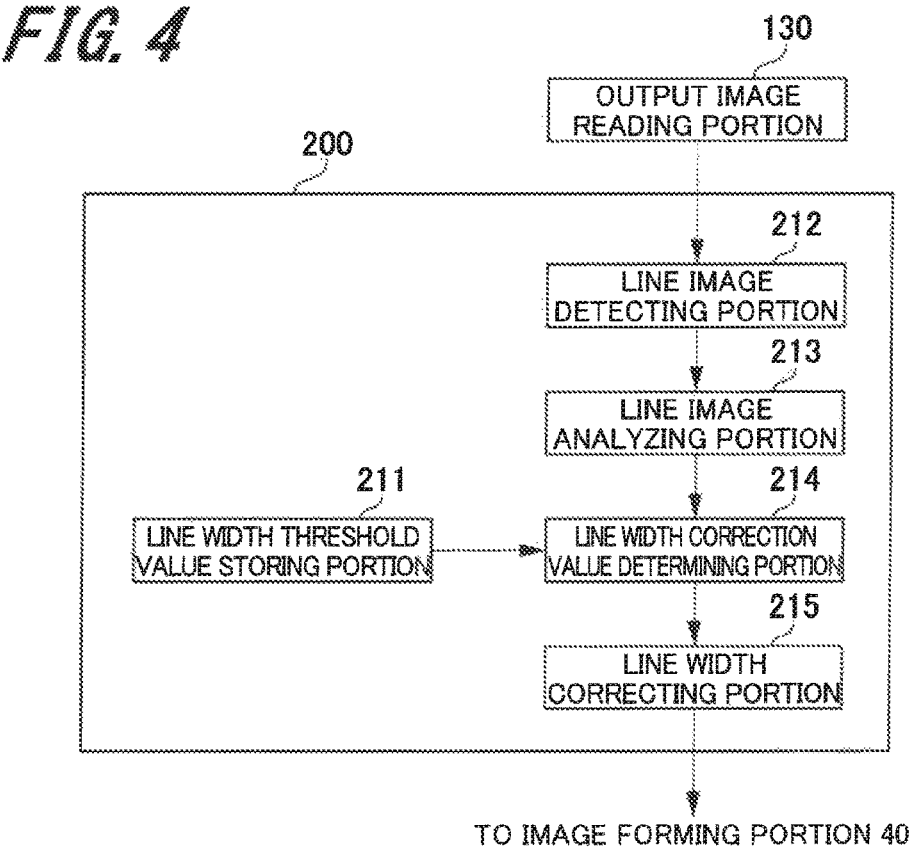
FIG. 4 is a functional block diagram showing one example of a function of a control portion.

FIG. 4 is a functional block diagram showing an example of a function of the control portion 200 of the PC 120. As shown in FIG. 4, the control portion 200 is configured with respective functional portions of a line-width threshold value storing portion 211, a line image detecting portion 212, a line image analyzing portion 213, a line-width correction value determining portion 214, and a line-width correcting portion 215. The image data obtained by the reading from the output document in the output image reading portion 130 (refer to FIG. 1 and FIG. 2) is supplied to the control portion 200.

The line-width threshold value storing portion 211 stores a preliminarily set line-width threshold value corresponding to a line width of the line image to be printed on the output document. Here, the "line-width threshold value" is a threshold value to be a determination criterion of whether or not to perform the line width correction, and has a predetermined allowable range (allowable width). The line-width threshold value storing portion 211 can use the ROM 202, which is not limited. The line image detecting portion 212 detects a line image formed at a predetermined position of the output document from the image data supplied from the output image reading portion 130.

The line image analyzing portion 213 analyzes the line width of the line image detected by the line image detecting portion 212. The line-width correction value determining portion 214 compares the line width analyzed by the line image analyzing portion 213 with the line-width threshold value having the predetermined allowable range which is stored preliminarily in the line-width threshold value storing portion 211, and determines the line-width correction value based on the comparison result. The line-width correcting portion 215 performs the line width correction on a line image to be formed by the image forming portion 40 (refer to FIG. 1) according to the line-width correction value determined by the line-width correction value determining portion 214.

The above configured control portion 200 of the PC 120 can realize, with software, respective functions of the line image detecting portion 212, the line image analyzing portion 213, the line-width correction value determining portion 214, and the line-width correcting portion 215 by the CPU 201 interpreting and executing a program which realizes the respective functions, for example.

Details of a processing method, which is an image processing method in accordance with embodiments of the invention, for the above respective functional portions, that is, the line image detecting portion 212, the line image analyzing portion 213, the line-width correction value determining portion 214, and the line-width correcting portion 215, will be made clear in Examples to be explained below.

Here, an object region where the line width correction is performed is assumed to be designatable by a user. Further, the line width analysis and correction execution timing to be explained in the following is assumed to be set, under the designation by the user, at timing from X-th (X≥1) sheet of the output document, and the line width analysis is performed on the X-th sheet of the set timing and the correction value obtained from the line width analysis result is applied from the (X+1)-th sheet.

Example 1

In Example 1, the line image analyzing portion 213 sets a line pattern image added to an output document as the line image to analyze, reads the line pattern image, and corrects the boldness of a line according to the line width of the read line pattern image. The line pattern image is added to the output document under a user's instruction in the PC 120, based on the preliminarily defined number of lines, print position information, and line width information. In FIG. 1, the image of the output document to which the line pattern image is added is read by the output image reading portion 130 which is disposed on the conveyance path on the downstream side of the fixing portion 70 in the conveyance direction of the sheet S. The output image reading portion 130 reads the image including the line pattern image added to the output document across the whole sheet face of the output document, and supplies the image data obtained by the reading to the control portion 200.

In the control portion 200, the line-width threshold value storing portion 211 (e.g., ROM 202) preliminarily stores the line-width threshold value including the predetermined allowable range which is set based on correspondence relationship between a line width of the line pattern image and a line width of the image data read by the output image reading portion 130.

The line image detecting portion 212 estimates the position of the line pattern image in the image data from the print position information defined when the line pattern image is added, based on the image data read by the output image reading portion 130. Then, the line image detecting portion 212 develops a first window region of N pixels×M pixels (N≥1, M≥1) including the line pattern image (in the following, described simply as "N×M window region") for the estimated line pattern image position, and detects whether or not a line exists within the N×M window region and a detailed line position.

More specifically, the line image detecting portion 212 extracts pixel values of the N×M window region including the line pattern image from the image data, and generates profile gradation data which is obtained by averaging the pixel values in each of directions parallel to the main scan direction and the sub-scan direction. Here, the "main scan direction" means the scan direction when the electrostatic latent image is formed on the photoreceptor 41 by the laser beam (i.e., axial direction of the photoreceptor 41) and the "sub-scan direction" means the rotational direction of the photoreceptor 41 (i.e., conveyance direction of the sheet S).

The line image detecting portion 212 compares the difference between the maximum value and the minimum value of the generated profile gradation data with a predetermined threshold value having a preliminarily set allowable width, and, if the difference is not smaller than the upper limit value of the threshold value, determines that pixel value continuity exists at a position where the profile gradation data has a peak. The pixel value continuity may be detected by means of scanning the N×M window region, comparing the predetermined threshold value having the preliminarily set allowable width with the pixel values, counting the number of continuing pixel values not larger than the lower limit value of the threshold value, and comparing the counted number with a preliminarily set continuous count threshold value.

Figure 5:
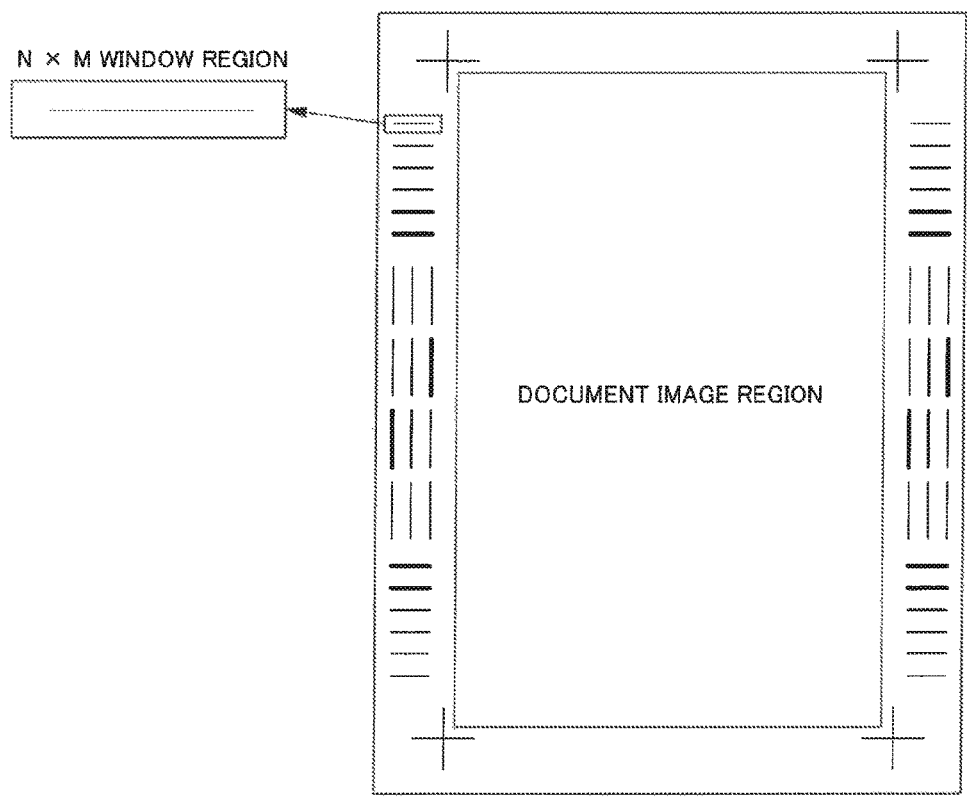
FIG. 5 is an image diagram of detection of a position where a line exists in a main scan direction or a sub-scan direction.
Figure 6:
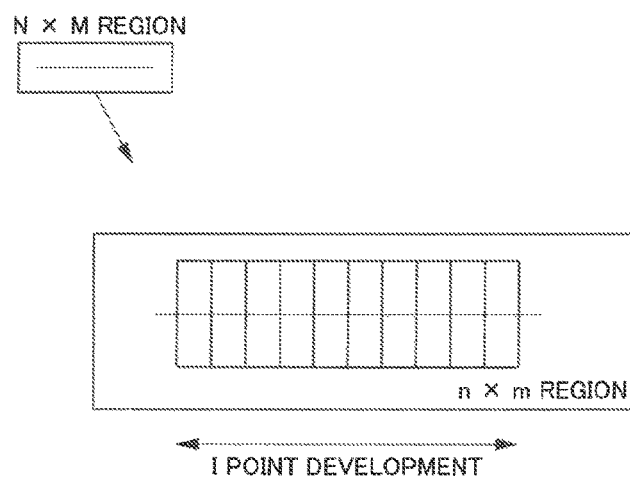
FIG. 6 is an image diagram of continuous I point development in an n×m window region in a direction parallel to a line.

As shown in FIG. 5, the line image analyzing portion 213 determines that the position where the pixel value continuity is detected to be a position where a line exists in the main scan direction or the sub-scan direction, and performs line width analysis on the position. Specifically, the line image analyzing portion 213 performs continuous I point (I≥1) development of a second window region of n pixels×m pixels (N>n, M>m) including the detected line in the image data (in the following, described simply as "n×m window region"), in a direction parallel to the line as shown in FIG. 6, and performs line width analysis in each n×m window region. Then, the line image analyzing portion 213 obtains an average pixel value in a direction parallel to the line from the pixel values of the n×m window region to generate profile gradation data.

After the generation of the profile gradation data, the line image analyzing portion 213 scans the profile gradation data to rearrange the data sets in a gradation order, divides the rearranged data sets into a highlighted region, intermediate gradation region, and a shadow region, and obtains an average pixel value of the highlighted region and an average pixel value of the shadow region. Then, a line threshold value is set between the average pixel value of the highlighted region and the average pixel value of the shadow region (average pixel value of the highlighted region≥line threshold value>average pixel value of the shadow region). Here, the "line threshold value" is a threshold value for determining the line width.

Figure 7:
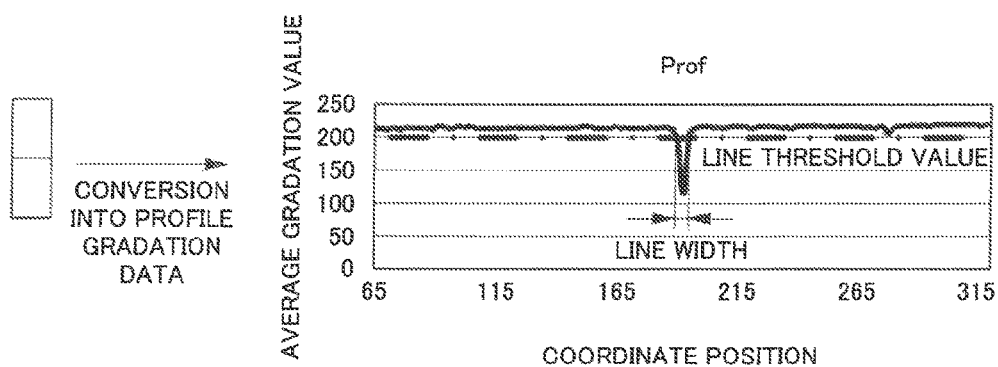
FIG. 7 is an image diagram of line width detection.

After the setting of the line threshold value, the line image analyzing portion 213 scans the profile gradation data, compares the line threshold value with a gradation value, and detects a position where the gradation value is switched between values not larger and not smaller than the threshold value. Then, the line image analyzing portion 213 assumes that the distance between the two pints where the gradation value is switched in the profile gradation data to be a temporary line width, analyzes the line width in each of the n×m window regions of all the I points, records a line width which is a temporary line width averaged at the I point, as a line width of the analysis result. FIG. 7 shows an image of the line width detection.

The line width analysis in the line image analyzing portion 213 is configured to be carried out only when the line pattern image to be analyzed is printed. Further, when even one line is not detected as the result of the line analysis, the line analysis is configured not to be carried out.

The line-width correction value determining portion 214 compares the line width analyzed by the line image analyzing portion 213 with the line-width threshold value preliminarily stored in the line-width threshold value storing portion 211. The line-width threshold value corresponds to the line width of the line image to be printed, and is stored preliminarily in the line-width threshold value storing portion 211 including the predetermined allowable range corresponding to the line width read from the image data. For example, the line width to be read as the image data is set to be 3.3 to 4.7 pixels (corresponding to 139 to 199 [μm] (resolution of the output image reading portion 130: 600 dpi)) for the line width to be printed of 169 [μm] (corresponding to 8 pixel line in 1200 dpi), and the line-width threshold value is stored in the line-width threshold value storing portion 211.

The line-width correction value determining portion 214 determines that the line is printed thicker than the line width to be printed if the analyzed line width is not smaller than the line-width threshold value (upper limit value of the allowable range) when the analyzed line width is compared with the line-width threshold value having the predetermined allowable range, and determines a correction value for performing line thinning. Further, if the analyzed line width is not larger than the line-width threshold value (lower limit value of the allowable range), it is determined that the line is printed thinner than the line width to be printed, and a correction value is determined for performing line thickening.

The correction value for performing the line width correction (in the following, described as "line-width correction value") is determined from a difference value between the analyzed line width and the line-width threshold value. Specifically, a table (LUT: Look Up Table) in which a coefficient or a correction value for changing line width correction strength can be selected according to the difference value between the analyzed line width and the line-width threshold value is prepared preliminarily, and thereby the line-width correction value can be determined based on the difference value from the table. Further, the line-width correction value is assumed to change in a stepwise manner according to the difference value. A table for obtaining the line-width threshold value records the line-width threshold value for every resolution in the image data read by the output image reading portion 130, to enable the line-width threshold value to be switched according to the resolution of the output image reading portion 130. That is, the line-width threshold value is made switchable according to the resolution of the output image reading portion 130.

The line-width correcting portion 215 performs the line width correction using a correction value determined by the line-width correction value determining portion 214 and a correction value added to a correction value applied to the analyzed line image.

The line thinning processing performed by the line width correction is processing of causing the pixel value inside the line image to become lighter with respect to the edge part of the line image, and realizes the thinning of the line image to be printed by causing the pixels in the edge part to become lighter in a stepwise manner according to the strength of the line-width correction value. Further, the line thickening processing performed by the line width correction is processing of causing the pixel value outside the line image to become darker with respect to the edge part of the line image, and realizes the thickening of the line image to be printed by causing the pixel of the edge part to become darker in a stepwise manner.

Figure 8:
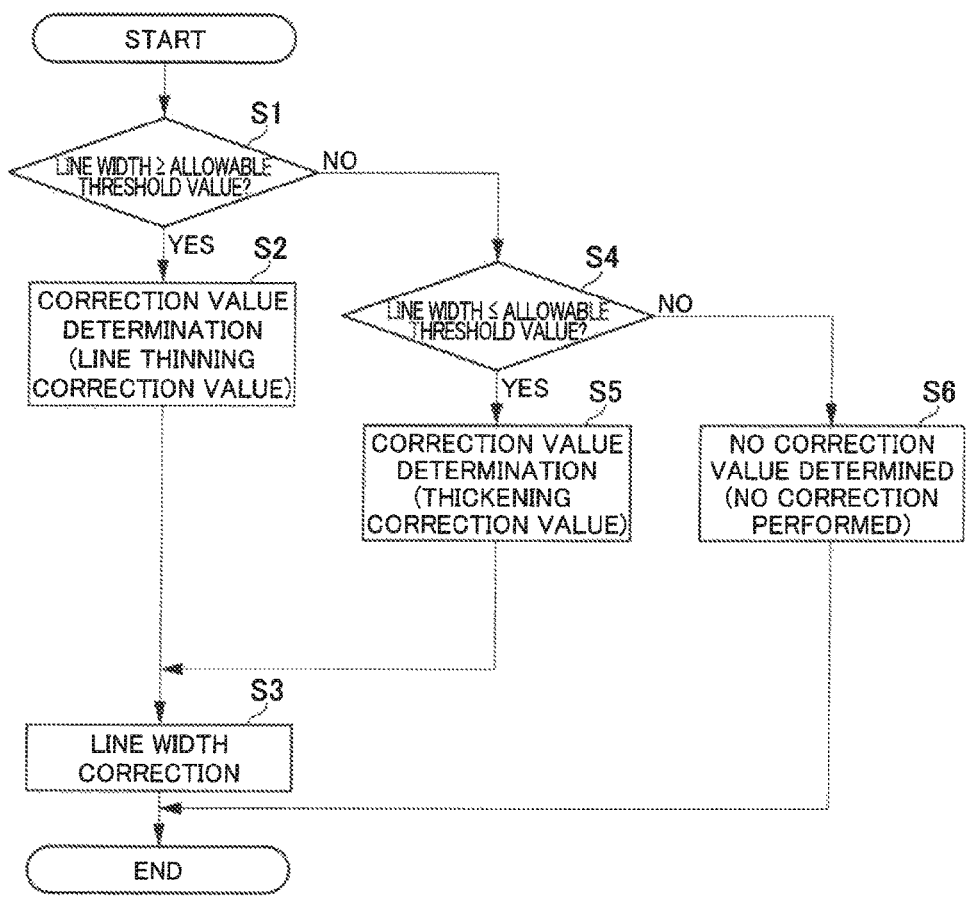
FIG. 8 is a flowchart showing one example of a series of processing flow for correction value determination and line width correction.

The flowchart of FIG. 8 shows one example of a series of processing flow of the correction value determination by the line-width correction value determining portion 214 and the line width correction by the line-width correcting portion 215. The series of processing is carried out under the control of the CPU 201 (refer to FIG. 3) in the control portion 200.

The CPU 201 determines whether or not the analyzed line width is not smaller than the allowable threshold value (upper limit value of the allowable range) (step S1), and, if the analyzed line width is not smaller than the upper limit value of the allowable range (YES in S1), determines the correction value for performing the line thinning processing (step S2), and then performs the line width correction (line thinning processing) based on the correction value (step S3). If the analyzed line width is smaller than the upper limit value of the allowable range (NO in S1), the CPU 201 determines whether or not the analyzed line width is not larger than the allowable threshold value (lower limit value of the allowable range) (step S4), and, if the analyzed line width is not larger than the lower limit value of the allowable range (YES in S4), determines the correction value for performing the line thickening processing (step S5), and then moves to step S3 to perform the line width correction (line thickening processing) based on the correction value. If the analyzed line width is larger than the lower limit value of the allowable range (NO in S4), the CPU 201 does not determine the line-width correction value (step S6), that is, does not perform the line width correction.

The above explained series of processing of the line width correction according to Example 1 is summarized as follows. That is, the position of the line pattern to be added and the line width information are preliminarily stored for the print document, the line pattern is added to a print document designated by a user, and output printing is performed. Then, the image data is obtained by the reading of the output document in the output image reading portion 130, the analysis with the N×M window region is performed on a preliminarily recorded predetermined line pattern position based on the read image data, the pixel continuity in each of the main scan direction and the sub-scan direction is detected, and a vertical line or horizontal line pattern detection is performed. For the detected vertical line or horizontal line pattern, further by the use of the n×m window region, the boldness of the line is obtained from the profile of the n×m window region.

The line threshold value processing for separating the line and the background is performed in the line width analysis. The line threshold value is calculated from the profile gradation data. Then, the line-width threshold value corresponding to the line width of the preliminarily stored line pattern is compared with the analyzed line width, and, if the boldness is not lower than the upper limit value of the line-width threshold value, the correction value to be applied is calculated from the difference between the line-width threshold value and the analyzed line width, and the line thinning processing is performed on the line image to be printed. If the line width is not larger than the lower limit value of the line-width threshold value, the correction value to be applied is calculated from the difference between the line-width threshold value and the analyzed line width, and the line thickening processing is performed on the line image to be printed.

According to the line width correction of Example 1 in which the line pattern image added to the output document is set as the line image to be analyzed, without using the dedicated chart, it is possible to perform the line width correction. Then, since the dedicated chart is not necessary, it is possible to perform the line width correction without generating a waste sheet and without deteriorating the productivity. Further, since the result of the line width analysis is reflected as the fine line correction value at frequent timing also during high volume printing, it is possible to obtain the output print in a line width having little variation.

(Variation Example of Example 1)

Note that the line region where the line width correction is performed can be configured to be selectable for each piece of object information such as a character, a graphics, and a line pattern image to be added. By the function, a user can perform the line width correction on a combination of desirable regions.

Figures 9A, 9B:
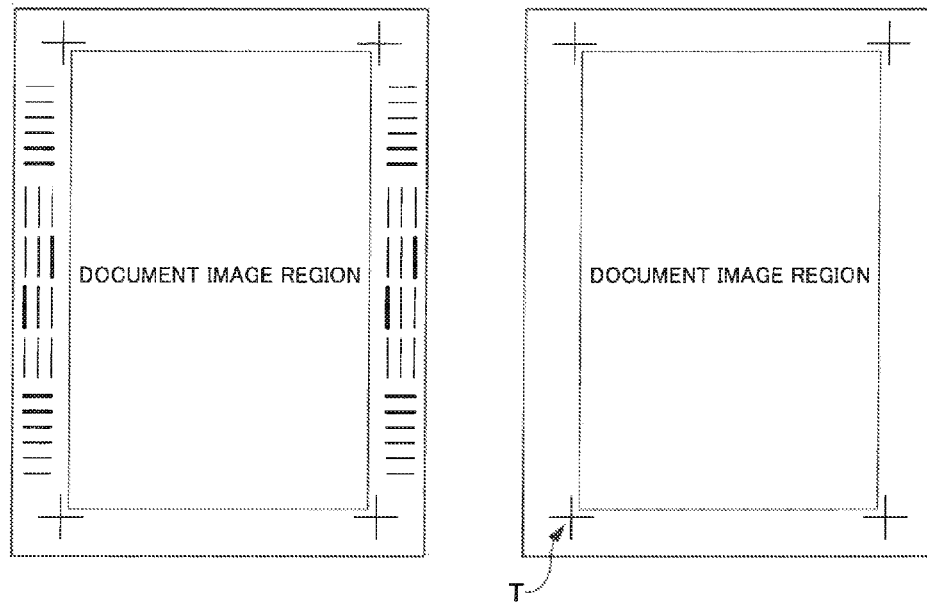
FIGS. 9A and 9B are diagrams explaining a line to be added when a line pattern image is added.

A vertical or horizontal straight line can be used for the line to be added when the line pattern image is added. At this time, as shown in FIG. 9A, a plurality of line width patterns is configured to be added to a region to be cut, and the addition of the line pattern image is configured not to be performed for the document image region to be output by a user. Thereby, the output document does not become a waste sheet but becomes an output document available as a printed matter.

Alternatively, a cutting register mark T which is a cutting mark indicating a cutting position can be used as the line to be added when the line pattern image is added, as shown in FIG. 9B. That is, by the utilization of the cutting register mark T added for indicating the cutting position, the line is analyzed based on print position information and line width information when the cutting register mark T is added.

Alternatively, a position measurement register mark which is a front-and-back position measurement mark to be added for the measurement of the position shift between the front and back prints when front-and-back double-side printing is performed can be used as the line to be added when the line pattern image is added. That is, by the utilization of the position measurement register mark to be added in the front-and-back double-side printing, the line is analyzed based on print position information and line width information when the position measurement register mark is added.

Further, each print color in the plurality of line pattern images is also configured to be selectable among cyan (C), magenta (M), yellow (Y), and black (K). At this time, a preliminarily defined line pattern, line width, line print position, and color information are stored as additional information, and transferred to be used for the line analysis of the image data read by the output image reading portion 130. Then, a color channel of the image data to be used for the line analysis is determined from the color information for the image data read by the output image reading portion 130. For example, the analysis is performed using a red (R) channel for a line having a print color of cyan, using a green (G) channel for a magenta line, and using a blue (B) channel for a yellow line, and using a green (G) channel for a black line.

Further, for the line pattern image printed having the same color and the same line width, the line width having suppressed variation across a face may be obtained by means of calculating an average line width by averaging the line widths analyzed from the image data read by the output image reading portion 130, and the obtained average line width may be compared with the line-width threshold value.

Figure 10:
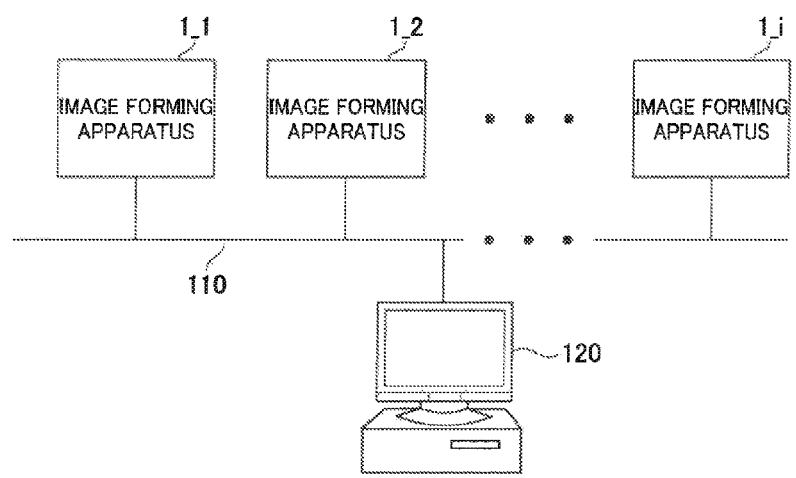
FIG. 10 is a configuration diagram of a system including a plurality of image forming apparatuses and one PC.

Note that, while one or more embodiments explain an example of an application to the case configured with one image forming apparatus 1 and the PC 120 (refer to FIG. 2), the invention is not limited to this case. As shown in FIG. 10, embodiments of the invention can be applied to a system configuration in which a plurality of image forming apparatuses 1_1 to 1_i and the PC 120 of the external apparatus are connected with each other via the communication line 110.

In the case of the system configuration, for the control target of the plurality of image forming apparatuses 1_1 to 1_i, the line widths analyzed by the line image analyzing portions 213 are summarized by the use of the PC 120, respective line-width threshold values corresponding to the image forming apparatuses 1_1 to 1_i are set based on the target line widths for desirable print line widths, and respective line-width threshold values of the plurality of image forming apparatuses 1_1 to 1_i are updated. Thereby, the control of causing the line widths of line images formed by the plurality of image forming apparatuses 1_1 to 1_i to match the target line widths, respectively, can be performed under combined management.

Example 2

In Example 2, a line image included in a character printed on the output document is set as the line image to be analyzed by the line image analyzing portion 213, and the character printed on the output document is read by the output image reading portion 130, and the boldness of the line is corrected according to the line width of the line image included in the character. The position of the character in the output document can be obtained as a position in RIP image data from tag information in raster image processing (in the following, described as "RIP") of converting character or image data into a raster image.

The line image detecting portion 212 estimates the position of the character in the image data read by the output image reading portion 130 based on the position information of the character obtained in RIP, develops an N×M window region including the line pattern image for the estimated character position, and detects whether or not a line exists in the N×M window region and detects a detailed line position. More specifically, the line image detecting portion 212 extracts pixel values of the N×M window region including the character from the image data, scans the extracted pixel values in each of the main scan and sub-scan directions, compares the pixel values with a preliminarily set threshold value, and counts the number of continuous pixels having pixel values not larger than a preliminarily set threshold value. Then, the line image detecting portion 212 detects the pixel value continuity by comparing the counted number of continuous pixels with a preliminarily set continuous count threshold value.

Figure 11:
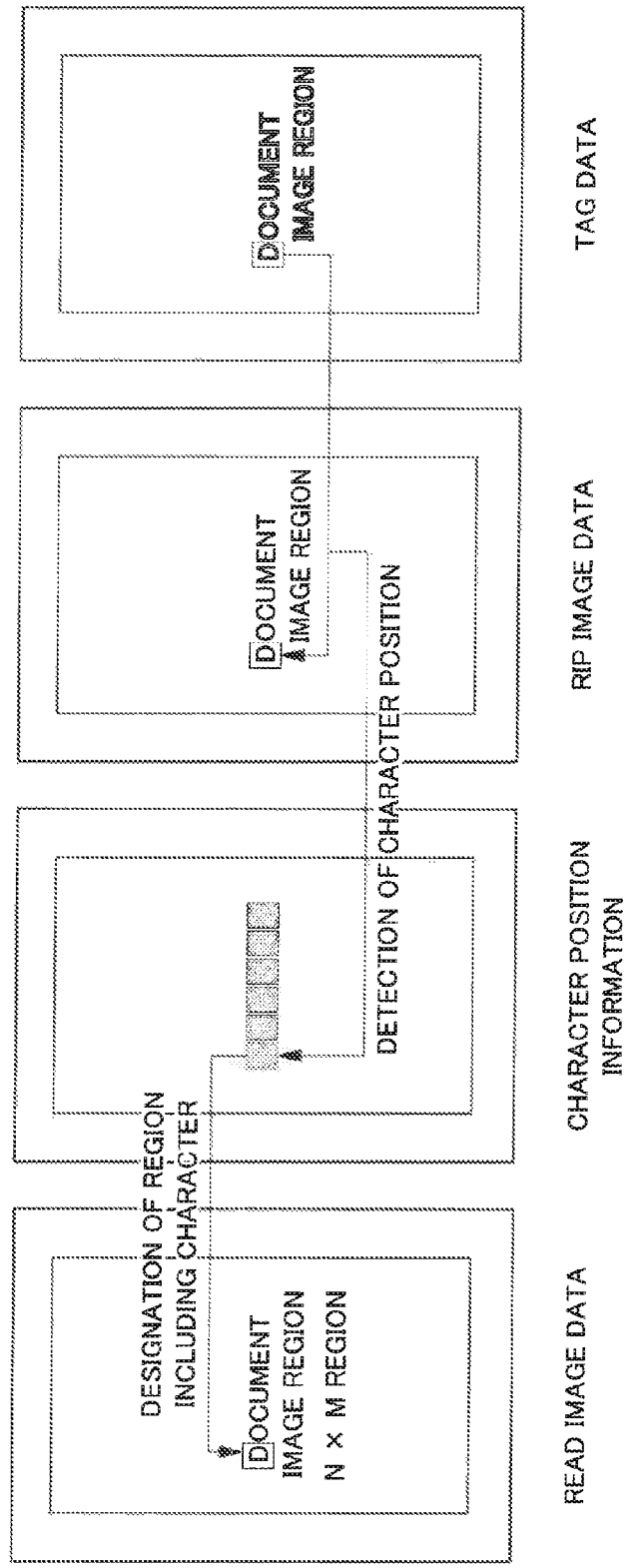
FIG. 11 is an image diagram of character position detection in Example 2.

The line image analyzing portion 213 determines that the position where the line image detecting portion 212 detected the pixel value continuity is a position where a line exists in the main scan direction or the sub-scan direction, and performs the line width analysis on the image data read by the output image reading portion 130. Further, the line image analyzing portion 213 performs the line width analysis also on a character which exists in the RIP image data at the same position as that in the image data read by the output image reading portion 130, and obtains the printed line width. Further, the line image analyzing portion 213, utilizing the tag information of the character at the same position, detects the pixel value continuity for the character part as in the image data read by the output image reading portion 130, and performs the line width analysis. FIG. 11 shows an image of the character position detection in Example 2.

The line width analysis by the line image analyzing portion 213 is performed by the same method as in the case of Example 1. That is, the line image analyzing portion 213 determines the line-width threshold value corresponding to the printed line width for the image data read by the output image reading portion 130, based on the line width of the obtained RIP image data, and compares the threshold value with the line width analyzed from the image data read by the output image reading portion 130.

Similarly to the case of Example 1, the line width analysis in the line image analyzing portion 213 is performed only when the line image to be analyzed is printed. Further, when even one line is not detected as the result of the line analysis, the line width analysis is not performed.

Further, other than the character position information and the tag information, character code information, vertical line and horizontal line information in the character code, character point (character size) information, or character color information in the RIP may be used for the line width analysis of a character. For example, a character in which a vertical line or a horizontal line continues across a predetermined number of pixels, that is, a character in which the pixel continuity is secured for easy line width analysis or a character printed having a line width in which line width variation is easily confirmed are defined preliminarily as a line-width analysis target character, and the information of the character code, the point number, the color or the like of the line-width analysis target character, is stored (recorded) preliminarily. Then, it is determined whether or not a line-width analysis target character exists, from the character code information in the RIP, and, when the line-width analysis target character exists, the line-width analysis target character in the image data read by the output image reading portion 130 is analyzed and the line width is calculated, based on the position information of the line-width analysis target character. By the method, it is possible to perform highly accurate line width analysis more efficiently.

The correction value determination by the comparison with the line-width threshold value by the line-width correction value determining portion 214 is performed with the same method as that of Example 1 (refer to FIG. 8). Further, also for the line-width correcting processing in the line-width correcting portion 215, the line thinning processing and the line thickening processing are performed with the same method as that in Example 1.

The above explained series of processing of the line width correction according to Example 2 is summarized as follows. That is, the position information of a character in the document is obtained from the tag information in the RIP of the output document. Then, the output-printed output document is read and the position of the character in the image data is estimated based on the character position information obtained in the RIP, the pixel continuity is analyzed in the N×M window region for the estimated character position in the main scan direction and the sub-scan direction, and a vertical line or a horizontal line is detected. Further, the n×m window region is used for the detected line and the boldness of the line is obtained from the profile of the n×m window region.

In the analysis of the line width, the line threshold value processing is performed for separating the line and the background. The line threshold value is calculated from the profile gradation data. A character at the same position as that in the PIP image data is extracted based on the tag information, and the line width analysis is performed on the character tag region, and thereby the line width to be used in printing is obtained. Further, the line-width threshold value for the read line width is determined based on the line width of an image in the RIP. Then, the line width obtained by the line width analysis and the line width of the analyzed read image data are compared, and, if the line width is not smaller than the upper limit value of the line-width threshold value, the correction value to be applied is calculated from the difference between the line-width threshold value and the line width, and the line thinning processing is performed on the character. If the line width is not larger than the lower limit value of the line-width threshold value, the correction value to be applied is calculated from the difference between the line-width threshold value and the line width, and the line thickening processing is performed on the character.

According to the line width correction of Example 2 which sets a line included in a character printed on the output document as the line image to be analyzed, it is possible to perform the line width correction without using the dedicated chart. Then, since the dedicated chart is not necessary, it is possible to perform the line width correction without generating a waste sheet and without deteriorating the productivity. Further, since the result of the line width analysis is reflected as the fine line correction value at frequent timing also in high volume printing, it is possible to obtain the output print in a line width having little variation.

(Variation Example of Example 2)

Also in Example 2, as in Example 1, the line region where the line width correction is performed can be configured to be selectable for each piece of the object information such as a character, a graphics, and a line pattern image to be added. By the function, a user can perform the line width correction for a combination of desirable regions. Further, Example 2 is the same as Example 1 in the point, similarly, that Example 2 can also be applied to the system configured with the plurality of image forming apparatuses 1_1 to 1_i and one PC 120 shown in FIG. 10. Furthermore, it is possible to realize a configuration of performing the line width analysis by summarizing the images in a server or a cloud.

Further, by receiving color information of a character to be analyzed, it is also possible to determine the color channel of the image data to be used in the line width analysis for the image data read by the output image reading portion 130. For example, the analysis is performed using a red (R) channel for a character having a print color of cyan, using a green (G) channel for a magenta character, and using a blue (B) channel for a yellow character, and using a green (G) channel for a black character.

Variation Example

While the invention has been explained by the use of the embodiments in the above, the invention is not limited to the range described in the above embodiments. That is, various modifications or improvements can be added to the above embodiments in the range without departing from the invention, and modes in which such modifications or improvements are added also fall in the technical range of the invention.

For example, while the above embodiments exemplify the copy machine as the image forming apparatus 1 to which the image processing apparatus in accordance with embodiments of the invention is applied, the present invention is not limited to this application example. That is, the present invention can be applied to all the image forming apparatuses such as a printer apparatus, a facsimile apparatus, a printing machine, and a composite machine, other than the copy machine without departing from the invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 image forming apparatus
10 document conveying portion
20 sheet accommodating portion
30 document image reading portion
40 image forming portion
41 photoreceptor
44 development portion
50 intermediate transfer belt
51 primary transfer portion
60 secondary transfer portion
70 fixing portion
80 image processing portion
90 control substrate
100 control portion
110 communication line
120 personal computer (external information processing apparatus)
130 output image reading portion
211 line-width threshold value storing portion
212 line image detecting portion
213 line image analyzing portion
214 line-width correction value determining portion
215 line-width correcting portion

What is claimed is:

1. An image processing apparatus, comprising:
a sensor that reads an image of a physical document that has been image-formed and output in an image forming portion and is available as a printed matter for use by a user; and
a processor that:
  detects a line image included in a character printed on the physical document, using image data read by the sensor;
  determines a line width of the line image;
  compares the determined line width to a preliminarily set line-width threshold value to obtain a comparison result and determines a line-width correction value based on the comparison result; and
  performs line width correction on a line image of a to-be-formed physical document based on the line-width correction value.

2. The image processing apparatus according to claim 1, wherein
the line-width threshold value specifies a range based on a correspondence relationship between a line width of a line image included in the character and a line width of the character of the physical document, determining a line width of the line image comprises:

extracting a first window region of N pixels×M pixels that includes the character from the image of the physical document based on print position information determined from tag information in a raster image processing for the physical document, and detecting a line of the line image included in the character based on pixel value continuity of the first window region in each of a main scan direction and a sub-scan direction, comparing the determined line width to a preliminarily set line-width threshold value comprises:

extracting the line detected by the processor in a second window region of n pixels×m pixels (n<N and m<M), calculating a line width based on profile gradation data of the second window region and a preliminarily set line threshold value, and determining the line-width correction value based on a difference between the calculated line width and the preliminarily set line-width threshold value, and line width correction comprises:

performing line thinning processing where the line width calculated by the processor is not smaller than an upper limit value of the line-width threshold value, and performing line thickening processing where the calculated line width is not larger than a lower limit value of the line-width threshold value.

3. The image processing apparatus according to claim 2, wherein the processor further:

determines a line width of the line image on a character in which each of a vertical line and a horizontal line has a predetermined number of continuous pixels, and determines whether or not the character exists, from character code information in a raster image processing for the physical document, and in response to determining that the character exists, calculates a line width by analyzing the character from the image based on position information of the character.

4. The image processing apparatus according to claim 1, wherein the line-width threshold value is set based on a resolution of the image of the physical document.

5. The image processing apparatus according to claim 1, wherein the processor determines the line-width correction value based on a table in which a line width correction strength is changed in a stepwise manner according to a difference between a line width obtained from the image and the line-width threshold value.

6. A system comprising:

the image processing apparatus according to claim 1; and a plurality of image forming apparatuses each of which includes an image forming portion and is a control target, wherein a line width analyzed by the processor is summarized, and line-width threshold values are set corresponding to the plurality of image forming apparatuses based on target line widths for desirable print line widths, and each of the line-width threshold values is updated.

7. A non-transitory computer-readable recording medium storing a computer program that causes a computer of an image forming apparatus to execute processing comprising:

reading an image of a physical document that has been image-formed and output in an image forming portion and is available as a printed matter for use by a user;

detecting a line image included in a character printed on the physical document, using image data read by a sensor; and determining a line width of the line image.

8. The non-transitory computer-readable recording medium storing a program according to claim 7, wherein the line-width threshold value specifies a range based on a correspondence relationship between a line width of a line image included in the character and a line width of the character of the physical document, determining a line width of the line image comprises extracting a first window region of N pixels×M pixels that includes the character from the image data read by the sensor based on print position information determined from tag information in raster image processing, and detecting a line of the line image included in the character based on pixel value continuity of the first window region in each of a main scan direction and a sub-scan direction, comparing the determined line width to a preliminarily set line-width threshold value comprises extracting the line detected by a processor in a second window region of n pixels×m pixels (n<N and m<M), calculating a line width based on profile gradation data of the second window region and a preliminarily set line threshold value, and determining a line-width correction value based on a difference between the calculated line width and the preliminarily set line-width threshold value, and the processing further comprises performing line width correction comprising:

performing line thinning processing where the line width calculated by the processor is not smaller than an upper limit value of the line-width threshold value, and performing line thickening processing where the calculated line width is not larger than a lower limit value of the line-width threshold value.

9. The non-transitory computer-readable recording medium storing a program according to claim 8, wherein the processor further:

determines a line width of the line image on a character in which each of a vertical line and a horizontal line has a predetermined number of continuous pixels, and determines whether or not the character exists, from character code information in a raster image processing for the physical document, and in response to determining that the character exists, calculates a line width by analyzing the character from the image based on position information of the character.

* * * * *